(12) United States Patent
Delvaux et al.

(10) Patent No.: US 9,718,735 B2
(45) Date of Patent: Aug. 1, 2017

(54) CMC TURBINE COMPONENTS AND METHODS OF FORMING CMC TURBINE COMPONENTS

(71) Applicant: GENERAL ELECTRIC COMPANY, Schenectady, NY (US)

(72) Inventors: John McConnell Delvaux, Fountain Inn, SC (US); Andres Jose Garcia-Crespo, Greenville, SC (US); Victor John Morgan, Greenville, SC (US); Jacob John Kittleson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 198 days.

(21) Appl. No.: 14/612,806

(22) Filed: Feb. 3, 2015

(65) Prior Publication Data

US 2016/0221881 A1   Aug. 4, 2016

(51) Int. Cl.
 *B32B 3/24* (2006.01)
 *F01D 25/12* (2006.01)
 (Continued)

(52) U.S. Cl.
 CPC ............ *C04B 35/565* (2013.01); *B29C 71/04* (2013.01); *C04B 35/44* (2013.01); *C04B 35/52* (2013.01);
 (Continued)

(58) Field of Classification Search
 None
 See application file for complete search history.

(56) References Cited

U.S. PATENT DOCUMENTS 4,679,981 A    7/1987  Guibert et al.
5,269,653 A *  12/1993  Evans .................... F01D 5/186
                                                              415/115
(Continued)

FOREIGN PATENT DOCUMENTS

DE    19619438 A1 * 11/1997  ............. F01D 5/288
EP     1318273 A2     6/2003
(Continued)

OTHER PUBLICATIONS

Tului et al., Silicon carbide based plasma sprayed coatings, Jun. 2012, Surface & Coatings Technology, 207, pp. 182-189.*
(Continued)

*Primary Examiner* — Jeff Vonch
(74) *Attorney, Agent, or Firm* — McNees Wallace & Nurick LLC

(57) ABSTRACT

Components are disclosed which include a CMC substrate having a first surface and a second surface. The first surface is in fluid communication with a compressed, dry fluid, and the second surface is in fluid communication with a wet fluid stream and includes a hermetic coating. The components further include at least one opening extending from the first surface through a portion of the CMC substrate, wherein, upon removal of a fragment of one or both of the hermetic coating and the CMC substrate, the at least one opening selectively permits a flow of the compressed, dry fluid to the second surface. In one embodiment, the component is a gas turbine component, the wet fluid stream is a hot combustion stream, the hermetic coating is an environmental barrier coating, and the flow reduces or eliminates volatilization of the CMC substrate. Methods for forming the components are also disclosed.

17 Claims, 2 Drawing Sheets

(51) Int. Cl.

| | | |
|---|---|---|
| *F01D 25/24* | (2006.01) | |
| *C04B 35/00* | (2006.01) | |
| *C04B 35/44* | (2006.01) | |
| *C04B 35/52* | (2006.01) | |
| *C04B 35/565* | (2006.01) | |
| *B29C 70/54* | (2006.01) | |
| *F01D 5/18* | (2006.01) | |
| *B29C 71/04* | (2006.01) | |
| *F01D 25/14* | (2006.01) | |
| *F01D 5/28* | (2006.01) | |
| *F01D 11/08* | (2006.01) | |
| *F02C 6/06* | (2006.01) | |
| *F02C 6/08* | (2006.01) | |
| *B29L 31/00* | (2006.01) | |
| *B32B 3/26* | (2006.01) | |
| *F01D 11/24* | (2006.01) | |

(52) U.S. Cl.
CPC ............ *F01D 5/186* (2013.01); *F01D 5/282* (2013.01); *F01D 5/284* (2013.01); *F01D 5/288* (2013.01); *F01D 11/08* (2013.01); *F01D 25/14* (2013.01); *B29C 70/545* (2013.01); *B29L 2031/7504* (2013.01); *B32B 3/266* (2013.01); *F01D 11/24* (2013.01); *F01D 25/12* (2013.01); *F02C 6/06* (2013.01); *F02C 6/08* (2013.01); *F05D 2230/90* (2013.01); *F05D 2240/11* (2013.01); *F05D 2260/202* (2013.01); *F05D 2260/232* (2013.01); *F05D 2270/09* (2013.01); *F05D 2270/11* (2013.01); *F05D 2270/112* (2013.01); *F05D 2300/2261* (2013.01); *F05D 2300/6033* (2013.01)

(56) References Cited

U.S. PATENT DOCUMENTS

| | | | | |
|---|---|---|---|---|
| 5,683,825 A * | 11/1997 | Bruce | ............ | C23C 28/00 427/248.1 |
| 5,851,678 A * | 12/1998 | Hasz | ............ | C04B 35/01 428/469 |
| 5,851,679 A * | 12/1998 | Stowell | ............ | C23C 28/04 359/359 |
| 5,985,470 A * | 11/1999 | Spitsberg | ............ | C04B 41/009 428/469 |
| 6,039,537 A * | 3/2000 | Scheurlen | ............ | F01D 5/186 415/115 |
| 6,139,257 A | 10/2000 | Proctor et al. | | |
| 6,217,279 B1 | 4/2001 | Ai et al. | | |
| 6,375,425 B1 * | 4/2002 | Lee | ............ | C23C 28/00 29/889.721 |
| 6,735,953 B1 * | 5/2004 | Wolfe | ............ | B64D 13/06 165/144 |
| 6,749,396 B2 * | 6/2004 | Barry | ............ | F01D 5/186 415/115 |
| 6,899,518 B2 | 5/2005 | Lucas et al. | | |
| 7,063,503 B2 | 6/2006 | Meisels | | |
| 7,186,091 B2 * | 3/2007 | Lee | ............ | F01D 5/183 416/231 R |
| 7,513,737 B2 | 4/2009 | Daux et al. | | |
| 7,579,085 B2 * | 8/2009 | Hazel | ............ | C04B 41/009 416/241 B |
| 7,909,581 B2 * | 3/2011 | Klein | ............ | C23C 14/042 416/241 B |
| 8,182,199 B2 | 5/2012 | Farah et al. | | |
| 8,357,323 B2 * | 1/2013 | Morrison | ............ | B28B 1/002 264/258 |
| 8,444,372 B2 | 5/2013 | Suthar et al. | | |
| 2002/0190039 A1 * | 12/2002 | Steibel | ............ | B23K 26/1476 219/121.71 |
| 2003/0003328 A1 * | 1/2003 | Spitsberg | ............ | C04B 41/009 428/698 |
| 2003/0059577 A1 * | 3/2003 | Morrison | ............ | B32B 3/18 428/166 |
| 2003/0108424 A1 * | 6/2003 | Masaki | ............ | C23C 4/00 416/97 R |
| 2003/0115881 A1 * | 6/2003 | Lee | ............ | C23C 28/321 60/754 |
| 2003/0175122 A1 * | 9/2003 | Zhao | ............ | F01D 5/14 416/241 B |
| 2003/0207155 A1 * | 11/2003 | Morrison | ............ | B32B 18/00 428/699 |
| 2004/0123598 A1 * | 7/2004 | Ackermann | ............ | F23M 5/00 60/752 |
| 2004/0134897 A1 * | 7/2004 | Das | ............ | B23K 26/0622 219/121.71 |
| 2004/0226682 A1 * | 11/2004 | Ehrhard | ............ | F01D 5/18 165/11.1 |
| 2005/0112381 A1 * | 5/2005 | Raybould | ............ | C04B 41/52 428/446 |
| 2006/0024528 A1 * | 2/2006 | Strangman | ............ | C04B 41/009 428/701 |
| 2006/0099080 A1 * | 5/2006 | Lee | ............ | F01D 5/183 416/241 R |
| 2006/0120871 A1 * | 6/2006 | Thompson | ............ | F01D 5/147 416/97 R |
| 2006/0141154 A1 * | 6/2006 | Thebault | ............ | C04B 35/565 427/249.2 |
| 2006/0210800 A1 * | 9/2006 | Spitsberg | ............ | C04B 41/009 428/408 |
| 2007/0093587 A1 * | 4/2007 | Shen | ............ | C01B 31/36 524/443 |
| 2007/0184204 A1 * | 8/2007 | Balagopal | ............ | C23C 2/02 427/419.2 |
| 2008/0226871 A1 | 9/2008 | Klein | | |
| 2009/0004427 A1 * | 1/2009 | Sarrafi-Nour | ............ | C04B 41/009 428/76 |
| 2009/0074576 A1 * | 3/2009 | Brostmeyer | ............ | F01D 5/187 416/95 |
| 2009/0285680 A1 * | 11/2009 | Hess | ............ | F01D 5/081 416/1 |
| 2009/0297718 A1 * | 12/2009 | Sarrafi-Nour | ............ | C04B 41/009 427/377 |
| 2010/0021643 A1 * | 1/2010 | Lane | ............ | F01D 5/282 427/376.2 |
| 2010/0075106 A1 * | 3/2010 | Merrill | ............ | B32B 3/266 428/139 |
| 2010/0159252 A1 * | 6/2010 | Kirby | ............ | C04B 41/009 428/446 |
| 2010/0159253 A1 * | 6/2010 | Kirby | ............ | C04B 41/009 428/446 |
| 2010/0159261 A1 * | 6/2010 | Kirby | ............ | C04B 41/009 428/471 |
| 2010/0272953 A1 * | 10/2010 | Yankowich | ............ | F23M 5/085 428/138 |
| 2011/0052925 A1 * | 3/2011 | Sarrafi-Nour | ............ | C01B 31/36 428/448 |
| 2011/0158820 A1 | 6/2011 | Chamberlain et al. | | |
| 2011/0189015 A1 * | 8/2011 | Shepherd | ............ | F01D 5/186 416/95 |
| 2011/0203281 A1 | 8/2011 | Sarrafi-Nour et al. | | |
| 2012/0156054 A1 | 6/2012 | Lacy et al. | | |
| 2013/0025291 A1 * | 1/2013 | Meschter | ............ | C04B 41/89 60/772 |
| 2013/0255278 A1 * | 10/2013 | Razzell | ............ | F02C 7/12 60/806 |
| 2013/0330189 A1 * | 12/2013 | Garcia-Crespo | ............ | F01D 5/187 416/61 |
| 2014/0037969 A1 * | 2/2014 | Margolies | ............ | C23C 4/02 428/446 |
| 2014/0120308 A1 * | 5/2014 | Lin | ............ | C23C 28/3215 428/137 |
| 2014/0157783 A1 * | 6/2014 | Kidder | ............ | F23R 3/002 60/752 |

(56) References Cited

U.S. PATENT DOCUMENTS

| | | | | |
|---|---|---|---|---|
| 2014/0165419 A1* | 6/2014 | Luthra | ............... | C04B 41/009 34/467 |
| 2016/0003052 A1* | 1/2016 | Shi | ..................... | F01D 5/186 416/231 R |
| 2016/0215631 A1* | 7/2016 | Wan | .................. | C04B 41/009 |

FOREIGN PATENT DOCUMENTS

| | | | | |
|---|---|---|---|---|
| EP | 1321629 A2 | | 6/2003 | |
| EP | 1375825 A1 | | 1/2004 | |
| EP | 1655454 A1 | | 5/2006 | |
| EP | 1669545 A1 | | 6/2006 | |
| EP | 2716867 A1 | | 4/2014 | |
| JP | 62017307 A | * | 1/1987 | |
| JP | 2004339985 A | * | 12/2004 | |
| JP | 2008309051 A | | 12/2008 | |
| WO | 03026886 A2 | | 4/2003 | |
| WO | WO 2015071141 A1 | * | 5/2015 | ............. F01D 5/005 |

OTHER PUBLICATIONS

U.S. Appl. No. 62/020,532, related to U.S. Pub. No. 2016/0003052 A1, Jan. 2016.*

European Search Report and Opinion issued in connection with corresponding EP Application No. 16153118.1 on Jun. 15, 2016.

* cited by examiner

CMC TURBINE COMPONENTS AND METHODS OF FORMING CMC TURBINE COMPONENTS

FIELD OF THE INVENTION

The present invention is directed to turbine components and methods of forming turbine components. More particularly, the present invention is directed to turbine components and methods of forming turbine components including selective reduction of elimination of volatilization of ceramic matrix composites.

BACKGROUND OF THE INVENTION

Gas turbines are continuously being modified to provide increased efficiency and performance. These modifications include the ability to operate at higher temperatures and under harsher conditions, which often requires material modifications and/or coatings to protect components from such temperatures and conditions. As more modifications are introduced, additional challenges are realized.

One modification to increase performance and efficiency involves forming turbine components, such as, but not limited to shrouds, nozzles, combustion liners, buckets and shroud rings, from a ceramic matrix composite (CMC). CMC turbine components may be subject to degradation in a combustion flow field due to interactions of the CMC with combustion gases, include water, at elevated temperatures. For example, in a silicon carbide CMC, a portion of the silicon in the silicon carbide may interact with water to produce silanol species, such as silicon hydroxide, which may volatize under operating conditions in a turbine. To prevent such degradation, CMC turbine components may be protected with an environmental barrier coating (EBC). However, EBCs may be subject to spallation, particularly when subjected to high-thermo mechanical strain, such as may occur during a hard machine shutdown of a turbine, or due to foreign object damage or domestic object damage. In the event that a fragment of the EBC spalls, the CMC exposed by the loss of the EBC may again be subjected to degradation by volatilization with water.

Turbine components and methods of forming turbine components not suffering from the above drawbacks would be desirable in the art.

BRIEF DESCRIPTION OF THE INVENTION

In an exemplary embodiment, a component includes a CMC substrate having a first surface and a second surface. The first surface is in fluid communication with a compressed, dry fluid, and the second surface is in fluid communication with a wet fluid stream. The second surface includes a hermetic coating. The component further includes at least one opening extending from the first surface through a portion of the CMC substrate, wherein, upon removal of a fragment of one or both of the hermetic coating and the CMC substrate, the at least one opening selectively permits a flow of the compressed, dry fluid to the second surface.

In another exemplary embodiment, a gas turbine component includes a CMC substrate having a first surface and a second surface. The first surface is in fluid communication with a compressed, dry fluid, and the second surface is in fluid communication with a hot combustion stream. The second surface includes an environmental barrier coating. The gas turbine component further includes at least one opening extending from the first surface through a portion of the CMC substrate, wherein, upon removal of a fragment of one or both of the environmental barrier coating and the CMC substrate, the at least one opening selectively permits a flow of the compressed, dry fluid to the second surface and reduces or eliminates volatilization of the CMC substrate in the hot combustion stream.

In another exemplary embodiment, a method of forming a component includes forming at least one opening in a CMC substrate, wherein the at least one opening extends from a first surface through a portion of the CMC substrate, and forming a hermetic coating on a second surface of the CMC substrate, wherein upon removal of a fragment of one or both of the hermetic coating and the CMC substrate, the at least one opening selectively permits a flow of the compressed, dry fluid to the second surface.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are exemplary turbine components and methods of forming turbine components. Embodiments of the present disclosure, in comparison to methods and products not utilizing one or more features disclosed herein, reduces or eliminates volatilization of the CMC substrate in a hot combustion stream which may occur following a spallation event, improves the durability of CMC components in a turbine allowing for increased efficiency and power output in relation to components formed from metals requiring cooling, lengthens the service lifetime of CMC components in a turbine, and enables repair of components which would otherwise might require replacement at maintenance intervals.

Figure 1:
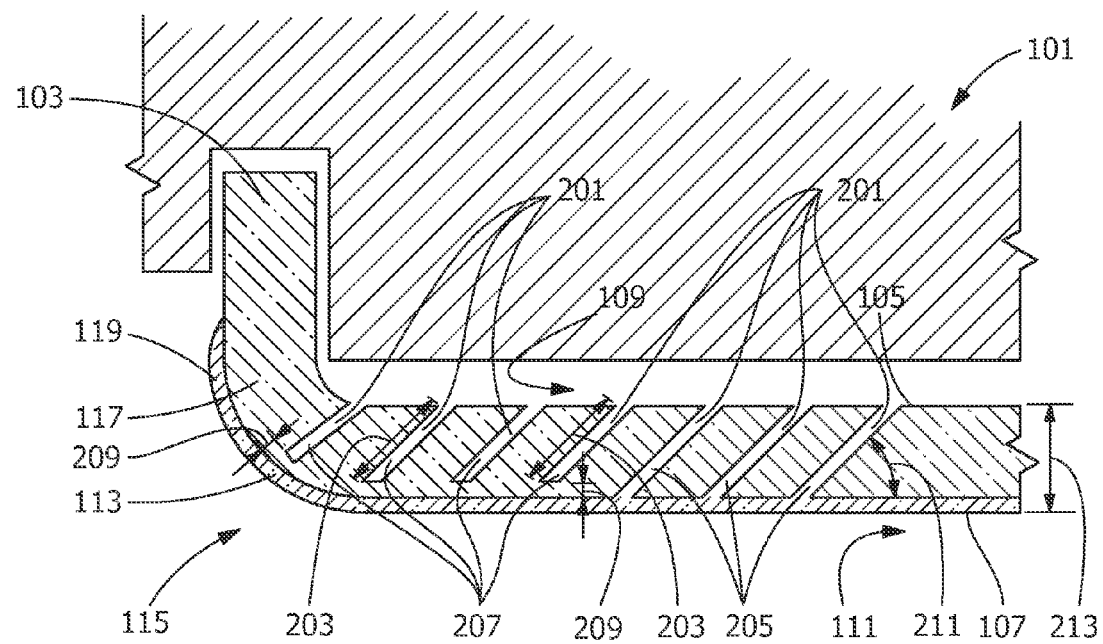
FIG. 1 is a sectioned view of a segment of a component, according to an embodiment of the present disclosure.

Referring to FIG. 1, in one embodiment, a component 101 includes a CMC substrate 103 having a first surface 105 and a second surface 107. The first surface 105 is in fluid communication with a compressed, dry fluid 109. The compressed, dry fluid 109 may include less than about 2 vol. % water, alternatively about 1 vol. % water, alternatively less than about 1 vol. % water. The second surface is in fluid communication with a wet fluid stream 111. The wet fluid stream 111 may include greater than about 2 vol. % water, alternatively greater than about 4 vol. % water, alternatively about 5 vol. % water, alternatively about 10 vol. % water, alternatively between about 5 vol. % water to about 20 vol. % water. The second surface 107 includes a hermetic coating 113. In a further embodiment, the compressed, dry fluid 109 has a greater pressure than the wet fluid stream 111, resulting in a pressure differential between the compressed, dry fluid 109 and the wet fluid stream 111. The pressure differential may be any suitable pressure differential, including, but not limited to, a pressure differential of about 1% to about 20%, alternatively about 5% to about 15%, alternatively about 10%. As used herein, a pressure differential of about 10% means that the pressure of the compressed, dry fluid 109 is about 10% greater than the pressure of the wet fluid stream 111.

The component 101 is any suitable component that may experience volatilization such as, but not limited to, a gas turbine component. In one embodiment, the component 101 is a shroud, a nozzle, a combustion liner, a bucket or a shroud ring 115. The wet fluid stream 111 may be a hot combustion stream of a gas turbine, and the compressed, dry fluid 109 may have a moisture content lower than the moisture content of the wet fluid stream 111.

The CMC substrate 103 includes a CMC material 117. Examples of the CMC material 117 include, but are not limited to, carbon-fiber-reinforced carbon (C/C), carbon-fiber-reinforced silicon carbide (C/SiC), silicon-carbide-fiber-reinforced silicon carbide (SiC/SiC), and alumina-fiber-reinforced alumina ($Al_2O_3/Al_2O_3$), and combinations thereof. The CMC material 117 may have increased elongation, fracture toughness, thermal shock, dynamical load capability, and anisotropic properties as compared to a monolithic ceramic structure. However, the CMC material 117 may be subject to volatilization under the operating conditions of a gas turbine.

For example, at temperatures above 1,500° F., water vapor may chemically react with the CMC material 117. The water vapor may react with silicon and carbon in the CMC material 117 to produce silanol species and carbon dioxide, respectively. The silanol species and carbon dioxide formed by the reaction between the water vapor and the CMC material 117 may volatilize. Over many hours of operation above 1,500° F., the CMC material 117 may be hydrolyzed and volatilized from the second surface 107 to the first surface 105.

In one embodiment, the hermetic coating 113 is an EBC 119. The EBC 119 protects the CMC material 117 from water vapor, heat, and other combustion gases which may cause the volatilization or deterioration of the CMC material 117. In a further embodiment, the EBC 119 reduces or eliminates the occurrence of the hydrolysis of the CMC material 117 by water vapor in the wet fluid stream 111. The EBC 119 may be any suitable material for protecting the CMC material 117 from the hot gases of combustion. The EBC may include, but is not limited to, silicon carbide, barium strontium alumino silicate (BSAS), mullite, yttria-stabilized zirconia, $Y_2Si_2O_7$, $Yb_2Si_2O_7$ and combinations thereof.

The component 101 includes at least one opening 201 extending from the first surface 105 through a portion 203 of the CMC substrate 103. In one embodiment, the at least one opening 201 is a full bore 205. As used herein, "full bore" indicates that the at least one opening 201 extends from the first surface 105 to the hermetic coating 113. In another embodiment, the at least one opening 201 is a partial bore 207. As used herein, "partial bore" indicates that the at least one opening 201 extends partially through the CMC substrate, leaving a CMC remainder 209 distal from the first surface 105. The remainder 209 may be any suitable thickness, including, but not limited to, not less than about 0.008 inches thick. Although FIG. 1 shows both full bore 205 at least one openings 201 and partial bore 207 at least one openings 201, embodiments may include at least one openings 201 which are only full bore 205 or only partial bore 207 or any combination thereof. Further, embodiments may include both full bore 205 at least one openings 201 and partial bore 207 at least one openings 201 which are isolated from one another or intermixed in any suitable pattern or arrangement.

In a further embodiment, the at least one opening 201 is positioned at an oblique angle 211 relative to the second surface 107. The oblique angle 211 is any suitable angle. For example, the oblique angle 211 may be from about 15° to about 60° relative to the second surface 107, alternatively from about 25° to about 45° relative to the second surface 107. The at least one opening 201 may also include a diffuser, such as a section having an expanding diameter in the direction from the first surface 105 to the second surface 107.

The at least one opening 201 may have any suitable cross-sectional conformation, including, but not limited to, an essentially circular cross-sectional conformation, an essentially polygonal cross-sectional conformation, or a combination thereof. The at least one opening 201 may also define a channel in the CMC substrate 103. As used herein, a "channel" indicates that the at least one opening 201 extends along a path through the CMC substrate 103 along the first surface 105 at least twice as far as the width of the at least one opening 201 at the first surface 105 perpendicular to the path at any point along the path. The path may be linear or curved, or any combination of linear and/or curved segments.

The component 101 may include a plurality of openings 201. In one embodiment, the plurality of openings 201 are distributed across the component 101 such that the plurality of openings 201 is concentrated in regions of the component 101 which are subject to greater risk of spallation events relative to the remaining regions of the component 101. By concentrating the plurality of openings 201 in areas of greater risk of spallation in the component 101, greater efficiencies are achieved with reduced processing, and any disadvantages associated with the inclusion of the plurality of openings 201 is minimized. The circumferential and axial spacing between the plurality of openings 201 may be any suitable spacing, for either all of the plurality of openings 201 or a clustered subset of the plurality of openings 201. In one embodiment, the ratio of the spacing between each of the plurality of openings 201 or a clustered subset of the plurality of openings 201 to the diameter of each of the plurality of openings 201 is about 2 to about 14, alternatively about 5 to about 11, alternatively about 7 to about 9. In the context wherein at least one of the plurality of openings 201 defines a channel, the diameter of an opening 201 which defines a channel shall be interpreted to be the width of the at least one opening 201 at the first surface 105 perpendicular to the path of the channel. In another embodiment, the spacing of the plurality of opening 201 or a clustered subset of the plurality of openings 201 may be about one half of the section thickness 213 between the first surface 105 and the second surface 107. In yet another embodiment, a majority of the plurality of openings 201 are oriented to align approximately with, rather than against or normal to, the flow direction of the wet fluid stream 111.

The component 101 may be formed by forming the at least one opening 201 in the CMC substrate 103, wherein the at least one opening 201 extends from the first surface 105 through a portion 203 of the CMC substrate 103, and forming the hermetic coating 113 on the second surface 107 of the CMC substrate 103. In one embodiment, the hermetic coating 113 is formed prior to the forming of the at least one opening 201 in the CMC substrate 103. In an alternative embodiment, the hermetic coating 113 is formed after the forming of the at least one opening 201 in the CMC substrate 103. The forming of the at least one opening 201 may be accomplished by any suitable method, including, but not limited to, drilling, laser drilling, or a combination thereof. The CMC substrate 103 may be formed by an additive manufacturing technique, such that the at least one opening 201 is formed simultaneously with formation of the CMC substrate 103.

Figure 2:
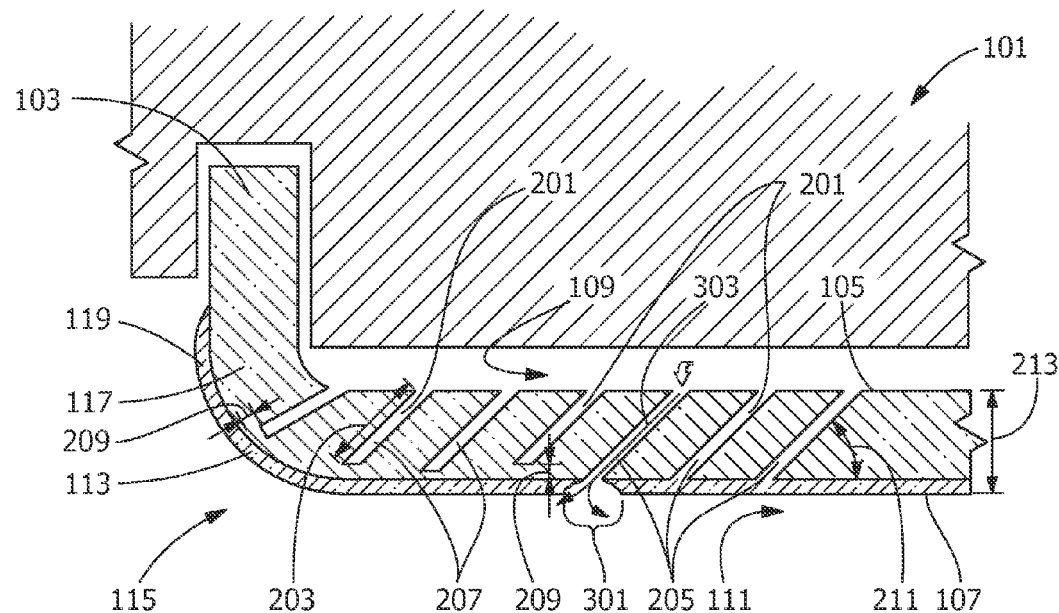
FIG. 2 is a sectioned view of a segment of the component of FIG. 1 following spallation of the hermetic coating of the component, according to an embodiment of the present disclosure.

Referring to FIG. 2, in the event of a spallation event of the hermetic coating 113, a hermetic coating spall site 301 is formed. At the hermetic coating spall site 301, a fragment of the hermetic coating 113 is removed, potentially exposing the CMC substrate 103 to the wet fluid stream 111. However, the formation of the hermetic coating spall site 301 also unseals the at least one opening 201, resulting in the at least one opening 201 being in fluid communication with the wet fluid stream 111. The pressure differential between the compressed, dry fluid 109 and the wet fluid stream 111 generates a flow 303 of the compressed, dry fluid 109 through the at least one opening 201 to the second surface 107 at the hermetic coating spall site 301, displacing the wet fluid stream 111. The flow 303 may be any suitable flow, including, but not limited to, a flow 303 through each of the at least one openings 201 of about 0.00001 lbs/s to about 0.00030 lbs/s, alternatively about 0.00005 lbs/s to about 0.00025 lbs/s, alternatively about 0.00010 lbs/s to about 0.00020 lbs/s, alternatively about 0.00014 lbs/s. By reducing or preventing the second surface 107 at the hermetic coating spall site 301 from being contacted by the wet fluid stream 111, the at least one opening 201 reduces or eliminates volatilization of the CMC substrate 103 in the wet fluid stream 111 which might otherwise occur.

Figure 3:
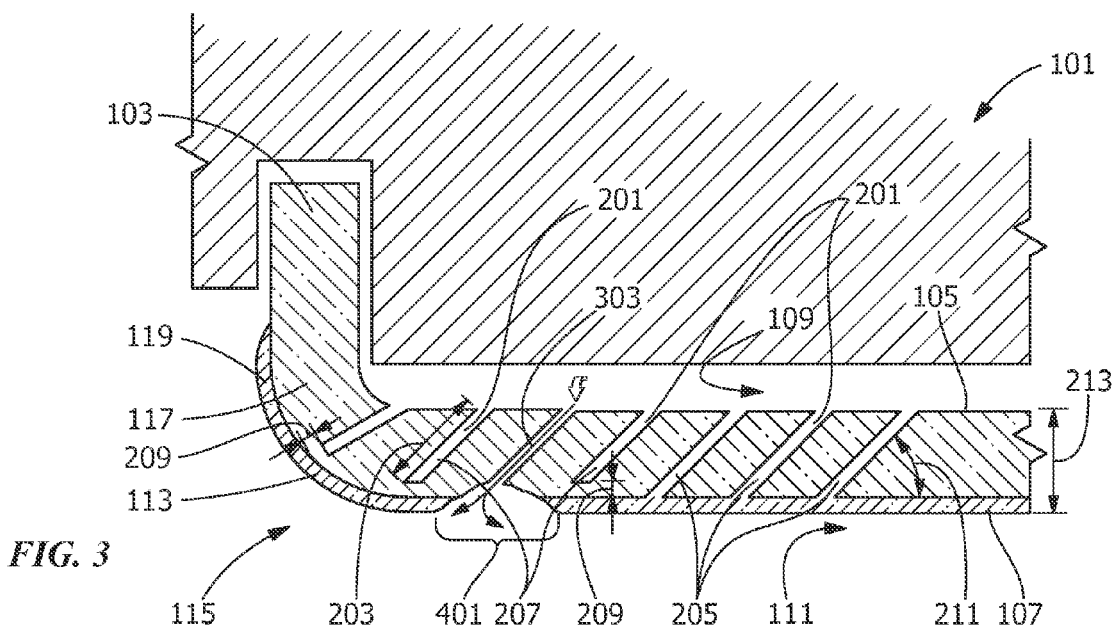
FIG. 3 is a sectioned view of a segment of the component of FIG. 1 following spallation of the hermetic coating and CMC substrate of the component, according to an embodiment of the present disclosure.

Referring to FIG. 3, in the event of a spallation event of the hermetic coating 113 and the CMC substrate 103, a CMC spall site 401 is formed. At the CMC spall site 401, a fragment of the hermetic coating 113 and the CMC substrate 103 is removed, potentially exposing the CMC substrate 103 to the wet fluid stream 111. However, the formation of the CMC spall site 401 also unseals the at least one opening 201, resulting in the at least one opening 201 being in fluid communication with the wet fluid stream 111. The pressure differential between the compressed, dry fluid 109 and the wet fluid stream 111 generates a flow 303 of the compressed, dry fluid 109 through the at least one opening 201 to the second surface 107 at the CMC spall site 401, displacing the wet fluid stream 111. The flow 303 may be any suitable flow, including, but not limited to, a flow 303 through each of the at least one openings 201 of about 0.00001 lbs/s to about 0.00030 lbs/s, alternatively about 0.00005 lbs/s to about 0.00025 lbs/s, alternatively about 0.00010 lbs/s to about 0.00020 lbs/s, alternatively about 0.00014 lbs/s. By reducing or preventing the second surface 107 at the CMC spall site 401 from being contacted by the wet fluid stream 111, the at least one opening 201 reduces or eliminates volatilization of the CMC substrate 103 in the wet fluid stream 111 which might otherwise occur.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A turbine component, comprising:
   a ceramic matrix composite (CMC) substrate having a first surface and a second surface, wherein:
   the first surface is in fluid communication with a compressed, dry fluid;
   the second surface is in fluid communication with a wet fluid stream, the compressed, dry fluid having a moisture content lower than the wet fluid stream; and
   the second surface includes a hermetic coating; and
   at least one opening extending from the first surface through a portion of the CMC substrate, wherein the hermetic coating is disposed over each such opening, and, upon removal of a fragment of one or both of the hermetic coating and the CMC substrate, the at least one opening selectively permits a flow of the compressed, dry fluid to the second surface,
   wherein the flow is sufficient to reduce or eliminate volatilization of the CMC substrate in the wet fluid stream, and
   wherein the component is a turbine component selected from the group consisting of a shroud, a shroud ring, and a combustion liner.

2. The turbine component of claim 1, wherein the hermetic coating is an environmental barrier coating.

3. The turbine component of claim 2, wherein the environmental barrier coating comprises silicon carbide.

4. The turbine component of claim 1, wherein the at least one opening extends from the first surface to the hermetic coating.

5. The turbine component of claim 1, wherein the at least one opening extends partially through the CMC substrate.

6. The turbine component of claim 1, wherein the CMC substrate comprises a material selected from the group consisting of carbon-fiber-reinforced carbon (C/C), carbon-fiber-reinforced silicon carbide (C/SiC), silicon-carbide-fiber-reinforced silicon carbide (SiC/SiC), alumina-fiber-reinforced alumina ($Al_2O_3/Al_2O_3$), and combinations thereof.

7. The turbine component of claim 1, wherein the at least one opening includes a diffuser at one end.

8. The turbine component of claim 1, wherein the at least one opening is positioned at an oblique angle to the second surface.

9. The turbine component of claim 1, wherein the wet fluid stream is a hot combustion stream.

10. A gas turbine component, comprising:
    a ceramic matrix composite (CMC) substrate having a first surface and a second surface, wherein:
    the first surface is in fluid communication with a compressed, dry fluid;
    the second surface is in fluid communication with a hot combustion stream, the compressed, dry fluid having a moisture content lower than the hot combustion stream; and
    the second surface includes an environmental barrier coating; and
    at least one opening extending from the first surface through a portion of the CMC substrate, wherein the environmental barrier coating is disposed over each such opening, and, upon removal of a fragment of one or both of the environmental barrier coating and the CMC substrate, the at least one opening selectively permits a flow of the compressed, dry fluid to the second surface and reduces or eliminates volatilization of the CMC substrate in the hot combustion stream, wherein the gas turbine component is selected from the group consisting of a shroud, a shroud ring, and a combustion liner.

11. A method of forming a component, comprising:

forming at least one opening in a ceramic matrix composite (CMC) substrate of a turbine component, wherein the turbine component is selected from the group consisting of a shroud, a shroud ring, and a combustion liner, and wherein the at least one opening extends from a first surface through a portion of the CMC substrate; and forming a hermetic coating on a second surface of the CMC substrate, the hermetic coating being disposed over each such opening and the second surface being in fluid communication with a wet fluid stream, wherein upon removal of a fragment of one or both of the hermetic coating and the CMC substrate, the at least one opening selectively permits a flow of a compressed, dry fluid to the second surface, the compressed, dry fluid having a moisture content lower than the wet fluid stream, and the flow is sufficient to reduce or eliminate volatilization of the CMC substrate in the wet fluid stream.

12. The method of claim 11, wherein the hermetic coating is formed prior to the forming of the at least one opening in the CMC substrate.

13. The method of claim 11, wherein the hermetic coating is formed after the forming of the at least one opening in the CMC substrate.

14. The method of claim 11, wherein the hermetic coating is an environmental barrier coating.

15. The method of claim 11, wherein forming the at least one opening includes mechanical drilling, laser drilling, or a combination thereof.

16. The method of claim 11, wherein the at least one opening extends from the first surface to the hermetic coating.

17. The method of claim 11, wherein the at least one opening extends partially through the CMC substrate.

* * * * *